BRAINARD & NEWTON.
Rotary Harrow.
No. 12,667.
Patented April 10, 1855.
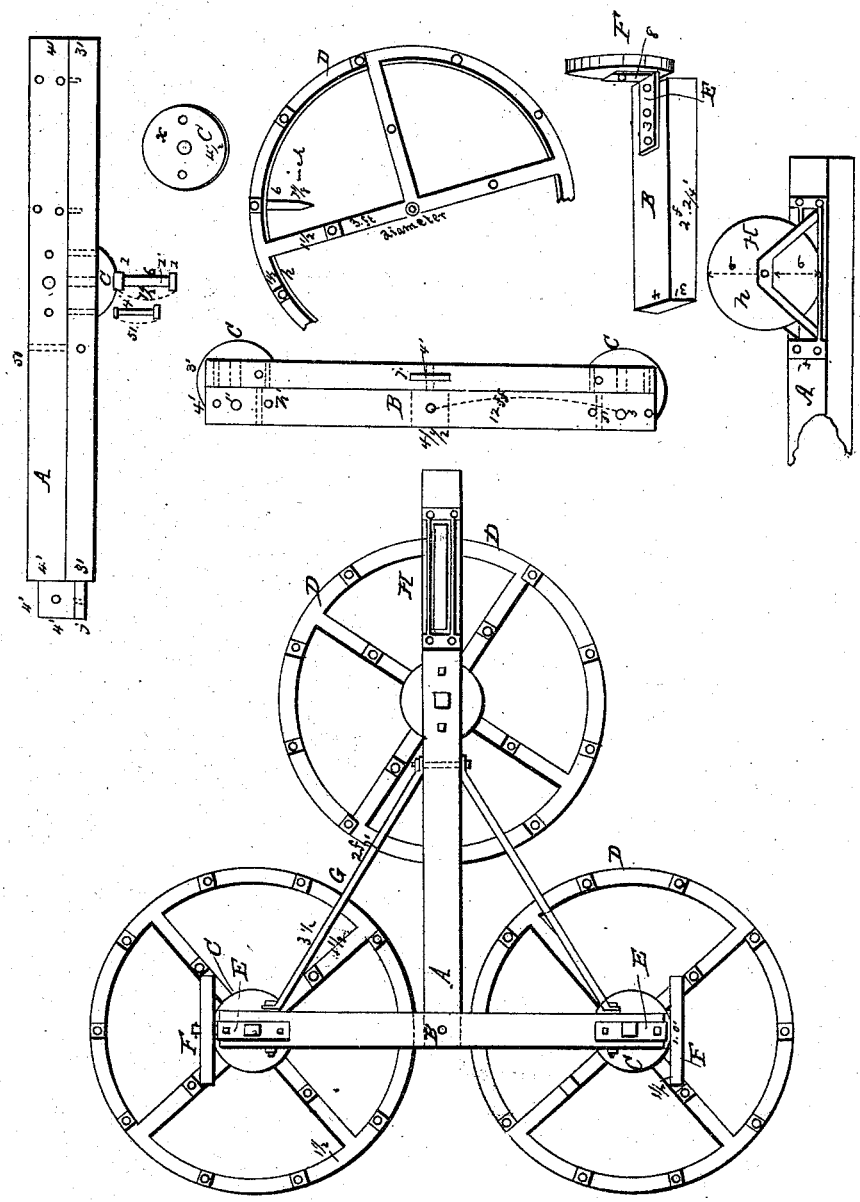

UNITED STATES PATENT OFFICE.

LYMAN BRAINARD AND LEVI NEWTON, OF ATTICA, NEW YORK.

IMPROVEMENT IN ROTARY HARROWS.

Specification forming part of Letters Patent No. 12,667, dated April 10, 1855.

*To all whom it may concern:*

Be it known that we, LYMAN BRAINARD and LEVI NEWTON, of Attica, in the county of Wyoming and State of New York, have invented a new and useful Improvement in a Horizontal Circular Reacting Harrow; and we do hereby declare that the following is a full and exact description thereof, reference being had to the accompanying drawings, and to the letters of reference marked thereon.

The nature of our invention consists in a harrow constructed of wheels or circles with teeth in them fastened in the center, so as to allow them to turn or react when they come in contact with any obstacle, so that it requires less strength to accomplish the same work.

To enable others skilled in the art to make and use our invention, we will proceed to describe its construction and operation.

We construct our harrow in a manner following: A beam of wood (marked A) five feet long and four inches wide and three inches thick; a cross-beam across one end of beam A, four feet and six inches long, and the same size as A, with a mortise in the center of the same, (marked B,) and secured with a pin or bolt and braced with two braces of iron five-eighths of an inch round or square, (marked G,) secured at the ends by bolts to the timbers A and B to make it of sufficient strength.

C is a plate of iron, nine inches in diameter and half an inch thick, bolted with two bolts, each to the under side of the timbers marked A and B, with a hole in the center to receive a bolt to connect it with the wheels or circles, (marked D.)

The wheels marked D are of wrought-iron; wheel or circle three feet in diameter, with four arms connected in the center, and a hole in the center to receive a bolt three-fourths of an inch in diameter to connect it with the plate marked C; the rim of iron one and a half inch wide and half an inch thick; the arm the same size as the rim, and to be welded or bolted to the rim; to be ten teeth in the rim and five in the arms of each wheel; in the rim the teeth to be equal space from each other, and in the arms to be half the space from the center to the rim; the teeth to be three-fourths of the end, square or round, and six inches long below the wheel, and to go through the wheel and fasten with a nut on the upper end, and connected with plate C with a bolt in the center, so as to allow the wheel D to turn or react when it comes in contact with any obstacle.

E is an axle-tree, of iron, fastened to the upper side of each end of timber marked B, and fastened with the same bolts that fasten plate C to the under side of timber marked B.

On the ends of axle-tree E is a wheel, (marked F,) ten inches in diameter, and one and a half inch on the face, fastened by a nut on the end or pin of the axle-tree E.

H is a wheel the same size as F, fastened near the front end of the beam A, on the upper side, with two iron braces.

The three wheels on the upper side, F and H, are for the purpose of drawing the harrow on, when removing it and put into use, by turning the harrow bottom side up.

The harrow is to be made all or any part of wood, iron, or any other material; the teeth to be of any size or length, to be any number of teeth in a wheel; the wheels to be of any size, and any number of wheels combined in a harrow.

We are aware that wheel-shaped harrow-frames have been used both without rotation and with a compulsory rotation in one direction; but

What we claim, and desire to secure by Letters Patent of the United States, is—

The employment of the wheel-shaped harrow, when fastened upon a central point, so as to turn in either direction, for the purpose and in the manner set forth.

LYMAN BRAINARD.
LEVI NEWTON.

Witnesses:
H. TAYLOR,
WILLIAM BATES.